（12） United States Patent
Shimokouchi et al.

(10) Patent No.: US 11,492,044 B2
(45) Date of Patent: Nov. 8, 2022

(54) VEHICLE FRONT STRUCTURE

(71) Applicant: Mazda Motor Corporation, Hiroshima (JP)

(72) Inventors: Tsuguo Shimokouchi, Aki-gun (JP); Kazuki Hirota, Aki-gun (JP); Takashi Hamada, Aki-gun (JP); Tadasuke Abe, Aki-gun (JP); Shunji Hiramatsu, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 182 days.

(21) Appl. No.: 16/991,048

(22) Filed: Aug. 12, 2020

(65) Prior Publication Data
US 2021/0053623 A1 Feb. 25, 2021

(30) Foreign Application Priority Data
Aug. 22, 2019 (JP) .............................. JP2019-152035

(51) Int. Cl.
*B62D 21/15* (2006.01)
*B60R 16/02* (2006.01)
*B62D 25/08* (2006.01)

(52) U.S. Cl.
CPC ........ *B62D 21/152* (2013.01); *B60R 16/0215* (2013.01); *B62D 25/081* (2013.01); *B62D 25/082* (2013.01)

(58) Field of Classification Search
CPC .. B62D 21/152; B62D 25/081; B62D 25/082; B60R 16/0215; B60K 2001/006; B60K 2001/0411; B60K 2015/0638; B60K 1/00
See application file for complete search history.

(56) References Cited

U.S. PATENT DOCUMENTS

| 10,661,668 | B2* | 5/2020 | Hosaka .................. B60L 50/66 |
| 2017/0015199 | A1 | 1/2017 | Shiba | |
| 2017/0203793 | A1* | 7/2017 | Nakamura ........... B62D 25/088 |
| 2018/0257508 | A1* | 9/2018 | Naito ....................... B60K 1/00 |
| 2019/0232776 | A1 | 8/2019 | Matsuda | |

FOREIGN PATENT DOCUMENTS

| JP | 2010-000852 A | 1/2010 |
| JP | 2018-114899 A | 7/2018 |

OTHER PUBLICATIONS

Extended European search report dated Feb. 9, 2021, in corresponding European patent Application No. 20189758.4, 8 pages.

* cited by examiner

*Primary Examiner* — Lori L Lyjak
(74) *Attorney, Agent, or Firm* — Xsensus LLP

(57) ABSTRACT

The present disclosure includes: a cowl member that is formed to extend in a vehicle width direction and bulges to the front from a rear side of a motor chamber; a power unit that is fixed to a right side frame in the motor chamber, has a lower portion fixed to a vehicle body, and drives the vehicle by electricity; and a protection bracket provided on an upper surface of the power unit, wherein the protection bracket is configured to abut the cowl member in the case where a frontal collision of a vehicle occurs and the power unit moves downward to the rear.

18 Claims, 7 Drawing Sheets

VEHICLE FRONT STRUCTURE

CROSS-REFERENCE TO RELATED APPLICATION

The present application claims priority to JP 2019-152035, filed Aug. 22, 2019, the entire contents of which are incorporated herein by reference.

TECHNICAL FIELD

The present disclosure relates to a vehicle front structure, in particular, to a vehicle front structure in a motor chamber arranged in a front portion of a vehicle.

BACKGROUND ART

A hybrid vehicle that includes both of a travel motor and an engine is described in JP-A-2018-114899 (Patent document 1). In this hybrid vehicle, a cowl member is installed in an engine compartment in a manner to bulge to the front. The engine, the motor, a power control unit, a battery, and the like are arranged in the engine compartment, and the power control unit is arranged to be located the highest of the components in the engine compartment. A connector that is connected to the battery is attached to an upper surface of the power control unit. In the case where this vehicle collides with a forward obstacle and the power control unit moves rearward with respect to a vehicle body, the power supply connector possibly comes into contact with a front end of the cowl member. For this reason, the vehicle in Patent document 1 is configured that a projected section projected above the connector is provided on the upper surface of the power control unit and that the projected section comes into contact with the cowl member prior to the connector.

SUMMARY

However, a direction in which the power control unit moves due to a shock during the collision differs by a structure to fix the power control unit, size and weight of the power control unit, a layout of peripheral components, and the like. Thus, with the structure in Patent document 1, the projected section may not come into contact with the cowl member at the time of the collision. More specifically, as the fixing structure of the power control unit, for example, there is a case where a lateral portion of the power control unit is fixed to a side frame and a lower portion thereof is fixed to the vehicle body. In this case, during a frontal collision of the vehicle, the side frame is bent, and the power control unit moves rearward with respect to the vehicle body. At the time, the power control unit also moves downward since the lower portion of the unit is fixed to the vehicle body. As a result, a height of the power control unit becomes lower than a height position thereof prior to the collision, and thus the projected section may not come in contact with the cowl member.

In the case where the height of the power control unit is lowered, just as described, and a clearance is consequently provided between the cowl member and the projected section, a fuel pipe, a power line, or the like disposed in the engine compartment possibly enters the clearance during the collision. Meanwhile, in the case where a protective cover or the like is additionally provided around the fuel pipe in order to protect the fuel pipe, the power line, or the like, weight of and a layout space in the vehicle are possibly increased.

Accordingly, the present disclosure relates to a vehicle front structure in a motor chamber arranged in a front portion of a vehicle, and has a purpose of preventing a fuel pipe from being sandwiched between a power unit and a cowl member in a case of a frontal collision of the vehicle without increasing weight of and a layout space in the vehicle.

In order to solve the above-described problem, the present disclosure relates to a vehicle front structure in a motor chamber arranged in a front portion of a vehicle and has: a cowl member that is formed to extend in a vehicle width direction and bulge to the front from a rear side of the motor chamber; a power unit that is fixed to a right side frame or a left side frame in the motor chamber, has a lower portion fixed to a vehicle body, and drives the vehicle by electricity; and a fuel pipe that couples an internal combustion engine in the motor chamber and a fuel tank arranged in a rear side of the vehicle. A protection bracket is provided on an upper surface of the power unit, and this protection bracket is configured to abut the cowl member in the case where a frontal collision of the vehicle occurs and the power unit moves downward to the rear.

According to the present disclosure that is configured as described above, the protection bracket is configured to abut the cowl member in the case where the frontal collision of the vehicle occurs and the power unit moves downward to the rear. Accordingly, a clearance is not provided between the cowl member and the protection bracket, and it is possible to prevent the fuel pipe from being sandwiched between the cowl member and the protection bracket. In this way, it is possible to prevent the fuel pipe from being sandwiched between the power unit and the cowl member without increasing weight of and a layout space in the vehicle.

In the present disclosure, preferably, the protection bracket has a projected section that is projected upward in a front view. According to the present disclosure that is configured as described above, it is possible to create a space in which the fuel pipe is disposed on a side in the vehicle width direction of the projected section of the protection bracket.

In the present disclosure, preferably, the projected section of the protection bracket is formed at a center in the vehicle width direction of the projection bracket in the front view. According to the present disclosure that is configured as described above, a force that is applied to the protection bracket at the time of pushing the cowl member upward can be dispersed in the vehicle width direction. In this way, it is possible to create the space by reliably pushing the cowl member upward, and it is thus possible to prevent the fuel pipe from being sandwiched.

In the present disclosure, preferably, the protection bracket has a bent section at a rear end in a side view, the bent section being bent in a circular shape. According to the present disclosure that is configured as described above, the cowl member can be pushed upward along the bent section that is bent in the circular shape. In this way, it is possible to create the space by reliably pushing the cowl member upward, and it is thus possible to prevent the fuel pipe from being sandwiched.

Preferably, the present disclosure further includes: a high-voltage harness that couples the power unit and a battery arranged at a center of the vehicle, and the protection bracket is formed such that a length thereof in the vehicle width direction is longer than a length of a connector of the high-voltage harness in the front view, and is arranged adjacent to the connector of the high-voltage harness.

According to the present disclosure that is configured as described above, the connector of the high-voltage harness is protected by the protection bracket. Thus, it is possible to prevent damage to the connector of the high-voltage harness.

According to the vehicle front structure of the present disclosure, it is possible to prevent the fuel pipe from being sandwiched between the power unit and the cowl member in the case of the frontal collision of the vehicle without increasing the weight of and the layout space in the vehicle.

DETAILED DESCRIPTION

Next, a description will be made on a vehicle front structure according to an embodiment of the present disclosure with reference to the accompanying drawings.

Figure 1:
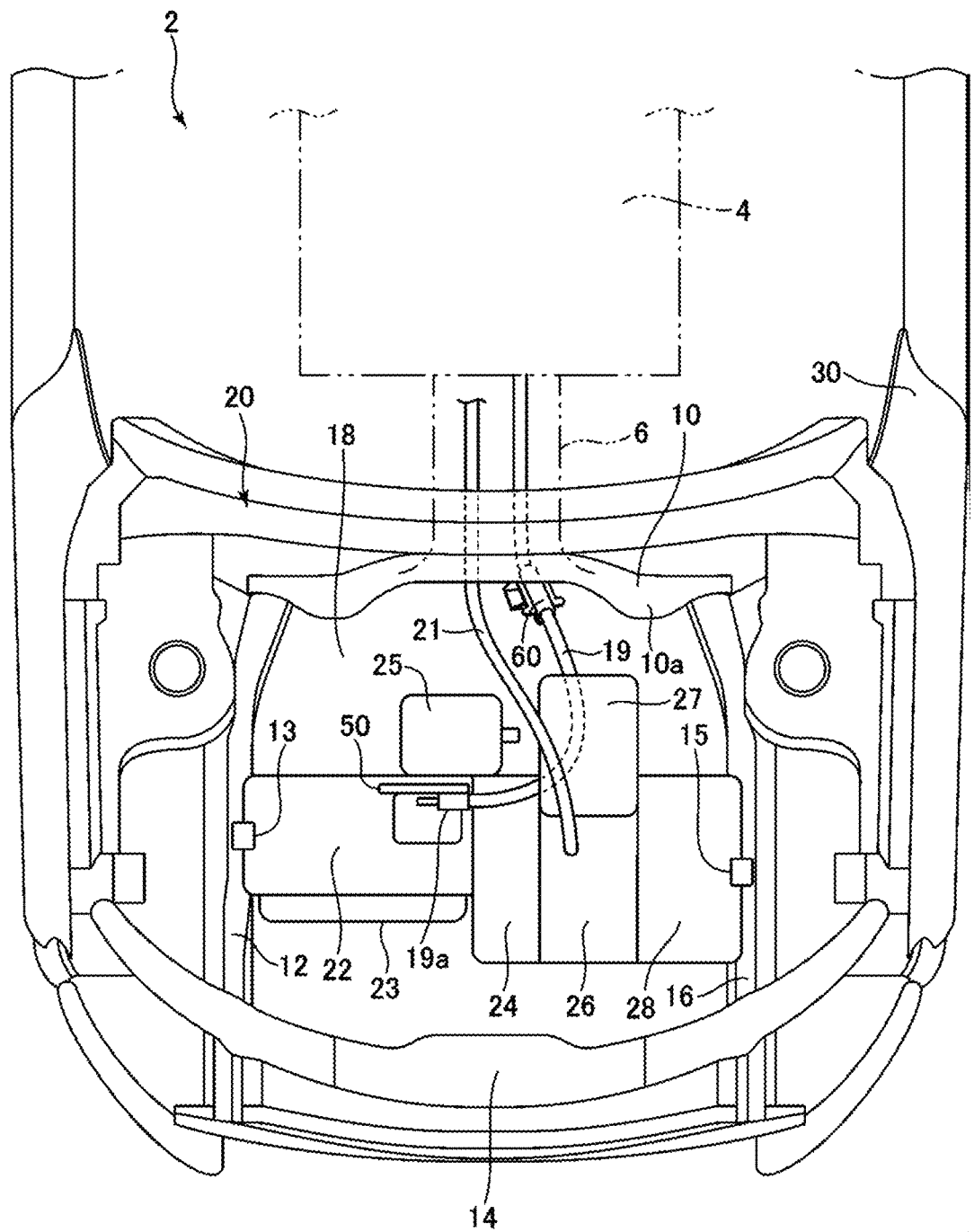
FIG. 1 is a top view illustrating a vehicle front structure according to an embodiment of the present disclosure.
Figure 2:
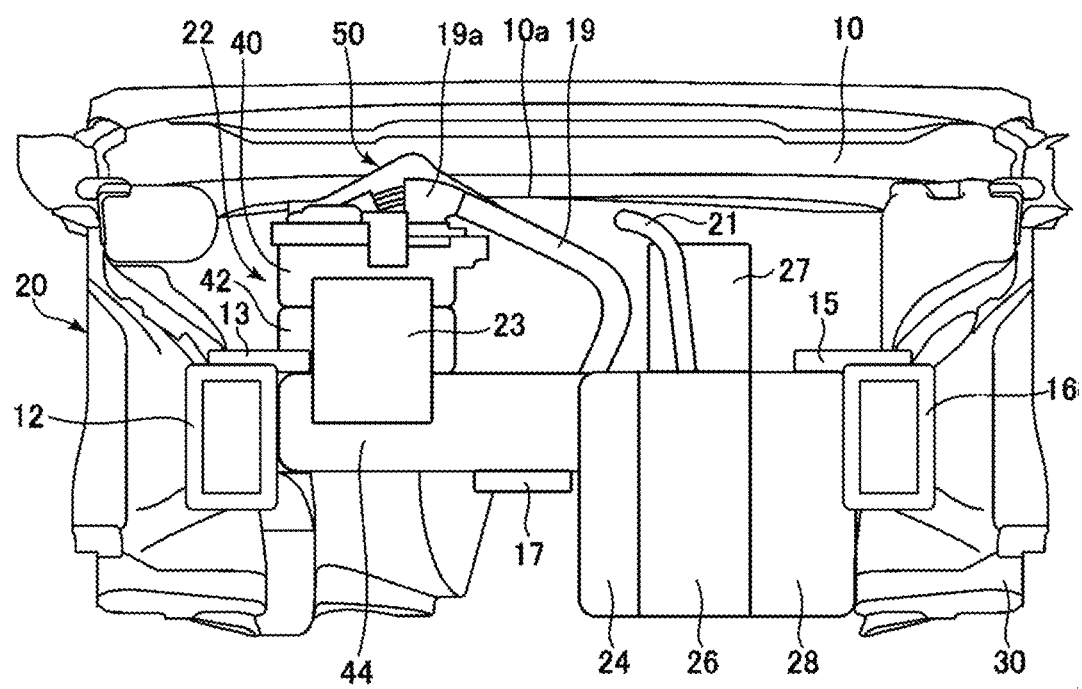
FIG. 2 is a front view illustrating the vehicle front structure according to the embodiment of the present disclosure.

FIG. 1 is a top view illustrating the vehicle front structure according to the embodiment of the present disclosure. FIG. 2 is a front view illustrating the vehicle front structure according to the embodiment of the present disclosure.

In the present specification, a description will be made that front-rear, right-left, and up-down directions seen from a driver who is seated on a driver's seat will respectively be defined as a longitudinal direction, a vehicle width direction, and a vertical direction.

First, a description will be made on a summary of a structure of a central portion or a rear portion of a vehicle 2 according to this embodiment with reference to FIG. 1.

As illustrated in FIG. 1, on the vehicle 2 according to this embodiment, a battery 4 as a lithium-ion battery that is formed in a rectangular shape in a top view (a plan view) is mounted at a center in a lower portion of the vehicle 2. The battery 4 extends from a position under a front seat of the vehicle 2 to a position near and under a rear seat, and is arranged at the center in the vehicle width direction. The battery 4 is attached to the lower portion of the vehicle 2. In addition, at the center in the vehicle width direction of the lower portion of the vehicle 2, a tunnel section 6 is provided to extend in the longitudinal direction. The tunnel section 6 is formed to have a cross-sectional shape that is recessed downward, and is formed to extend from a front portion of the vehicle 2 to a position near the rear seat through a position between the front seats.

Next, a description will be made on a summary of a vehicle front structure 20 according to this embodiment with reference to FIG. 1 and FIG. 2. The front portion of the vehicle 2 in front of the front seat and a front windshield (not illustrated) is formed with a motor chamber 18 that is surrounded by a cowl member 10, a right side frame 12, a front member 14, and a left side frame 16. Between the right side frame 12 and the left side frame 16 in the motor chamber 18, a power unit 22, a deceleration mechanism 24, an internal combustion engine 26, and a generator 28 are arranged in this order from the right side in the vehicle width direction and are coupled integrally. In addition, a DC/DC converter 23 is arranged on a front side of the power unit 22, and a compressor 25 is arranged on a rear side of the power unit 22. A converter 27 is arranged behind the internal combustion engine 26. When the vehicle 2 is used, the motor chamber 18 is covered with a hood (not illustrated) and thus cannot be seen from the outside.

The power unit 22 in the motor chamber 18 is coupled to the battery 4, which is arranged on the rear side of the power unit 22 and at the center of the lower portion of the vehicle 2, by a high-voltage harness 19 extending in the longitudinal direction. The high-voltage harness 19 extends longitudinally in the tunnel section 6 and is arranged along a lower surface shape of the tunnel section 6. Between the motor chamber 18 and the tunnel section 6, the high-voltage harness 19 is attached to a dash panel 11 or the tunnel section 6 via a bracket 60. In addition, the high-voltage harness 19 is arranged to enter the motor chamber 18 from a position near a center in the vehicle width direction of the cowl member 10. The high-voltage harness 19 that enters the motor chamber 18 first extends to a left side of a center axis at a center in the vehicle width direction of the motor chamber 18, and then extends to a right side of the center axis. A connector 19a as a tip of the high-voltage harness 19 is coupled to a left-side surface of the power unit 22 that is arranged on the right side of the center axis at the center in the vehicle width direction.

The internal combustion engine 26 in the motor chamber is coupled to a fuel tank (not illustrated) that is arranged in the rear side of the vehicle 2 by a fuel pipe 21 that extends in the longitudinal direction. The fuel pipe 21 extends longitudinally in the tunnel section 6 and is arranged along the lower surface shape of the tunnel section 6. The fuel pipe 2 is arranged to enter the motor chamber 18 from the position near the center in the vehicle width direction of the cowl member 10. In addition, the fuel pipe is arranged to be coupled to the internal combustion engine 26 that is arranged on the left side of the center axis at the center in the vehicle width direction of the motor chamber 18. The fuel pipe 21 and the high-voltage harness 19 are arranged to extend longitudinally in a manner to cross each other in the motor chamber 18.

Next, a detailed description will be made on each of the components in the vehicle front structure 20 according to this embodiment with reference to FIG. 1 and FIG. 2.

The cowl member 10 is arranged in front of the front seat and the front windshield (not illustrated) and behind the motor chamber 18, and extends in the vehicle width direction between the right side frame 12 and the left side frame 16. Both ends of the cowl member 10 are fixed to a vehicle body 30 so as to improve rigidity of the vehicle body 30. In addition, the cowl member 10 is formed to bulge to the front by a specified distance from a rear end of the motor chamber 18, and is formed such that a front end 10a of the cowl member 10 is located in the motor chamber 18. This bulging portion of the cowl member 10 prevents entry of rain water into the motor chamber 18 from a clearance between the front windshield and the hood in the rain.

The dash panel 11 is coupled to a lower portion of the cowl member 10. This dash panel 11 constitutes a rear wall of the motor chamber 18 and constitutes a partition wall that separates the motor chamber 18 and a cabin space from each other (see FIG. 2). The dash panel 11 is vertically provided at a position behind the front end 10a of the cowl member 10 by a specified distance. Due to the separation by this specified distance, a specified space is created in front of the dash panel 11. A lower end of the dash panel 11 is continuously connected to the tunnel section 6, which is formed in the lower portion of the vehicle body 30.

Each of the right side frame 12 and the left side frame 16 is made of metal and is formed to have a closed cross section in order to increase strength. Each of the right side frame 12 and the left side frame 16 extends horizontally in the longitudinal direction in the motor chamber 18. Each of the right side frame 12 and the left side frame 16 is fixed to the vehicle body 30 and thereby improves the rigidity of the vehicle body 30. A motor 44 in the power unit 22 is fixed to the right side frame 12 via a right engine mount 13, and the generator 28 is fixed to the left side frame 16 via a left engine mount 15.

The front member 14 is arranged at a front end of the motor chamber 18 and extends in the vehicle width direction between the right side frame 12 and the left side frame 16. The front member 14 is fixed to the vehicle body 30 and constitutes a front wall of the motor chamber 18.

As illustrated in FIG. 2, the power unit 22 is configured to include a junction box 40, an inverter 42, and the motor 44 and is a unit for converting and supplying electricity. The junction box 40, the inverter 42, and the motor 44 are arranged in this order from above and are coupled integrally. The junction box 40, the inverter 42, and the motor 44 are arranged to overlap each other in the top view. The DC/DC converter 23 is arranged on the front side of the power unit 22 and is coupled to the junction box 40. The compressor 25 is arranged on the rear side of the power unit 22 and is coupled to the motor 44.

The power unit 22 is fixed when an upper surface of the motor 44 is coupled to the right side frame 12 by a bolt via the right engine mount 13. Furthermore, the power unit 22 is fixed when a lower surface of the motor 44 near the center in the vehicle width direction is coupled to a suspension crossmember (not illustrated) of the vehicle body 30 by a bolt via an engine mount bracket 17. The engine mount bracket 17 is formed of a material with higher strength than the right engine mount 13. When a right front collision of the vehicle occurs, the right side frame 12 is bent, and the power unit 22 moves rearward with respect to the vehicle body 30. A bottom surface of the power unit 22 is coupled to the engine mount bracket 17. Thus, at the same time, the power unit 22 is pulled downward and moves downward to the rear.

The power unit 22 is configured that the junction box 40, the inverter 42, and the motor 44 are stacked in the vertical direction, and thus is the highest in the motor chamber 18. That is, a height position of an upper surface of the junction box 40 in the power unit 22 is set to be higher than height positions of upper surfaces of the deceleration mechanism 24, the internal combustion engine 26, the converter 27, and the generator 28 that are installed in the motor chamber 18. In addition, the height position of the upper surface of the junction box 40 is set to be lower than a height position of the front end 10a of the cowl member 10.

The junction box 40 is a connection box for protecting terminals used to join, branch, or relay power lines. In addition, an electric circuit including a relay is accommodated in the junction box 40. The upper surface of the junction box 40 is provided with a connection port used to connect the high-voltage harness 19, and the connector 19a of the high-voltage harness 19 is connected to the connection port. The high-voltage harness is fixed to the upper surface of the junction box 40 at a position adjacent to a protection bracket 50.

The inverter 42 is configured to convert DC power that is supplied from the battery 4 via the high-voltage harness 19 into AC power. The electric power, which is converted to the AC power by the inverter 42, is supplied to the motor 44 and is used to drive the motor 44.

The motor 44 includes a rotor, a stator, and an output shaft that are accommodated in a motor case (not illustrated). The rotor is joined to the output shaft that is directed horizontally, and is supported to be rotatable about an axis that is horizontal to the motor case. The stator is fixed to the motor case and is configured to rotationally drive the rotor by applying an AC current to a coil that constitutes the stator. The motor 44 drives a driveshaft of the vehicle 2 with the AC power that is applied thereto from the battery 4 via the inverter 42. The driveshaft of the vehicle 2 is driven by drive power of the motor 44 and is not directly driven by power that is generated by the internal combustion engine 26.

The DC/DC converter 23 is configured to step up and/or step down a DC voltage, and converts a voltage of the battery 4 in an appropriate level.

The compressor 25 is a rotary compressor and is a compressor used for an air conditioner of the vehicle 2. The compressor 25 includes: a body section 25a in a columnar shape; and a connector section 25b that is projected horizontally from a left surface of this main body to an outer side (the left side) in the vehicle width direction by a specified length. The compressor 25 is a high-voltage component, and the connector section 25b and the junction box 40 are connected via a power supply line (not illustrated). The compressor 25 is arranged at the substantially same height as the motor 44 and is arranged on a rear side of the motor 44. In addition, the compressor 25 is arranged in front of the bracket 60 that fixes the high-voltage harness 19, and is arranged such that the connector section 25b of the compressor 25 opposes the bracket 60 in the longitudinal direction.

The deceleration mechanism 24 is arranged between the motor 44 and the internal combustion engine 26 in the vehicle width direction, and is provided in the middle of a transmission path through which the power of the motor 44 is transmitted to wheels (not illustrated) of the vehicle 2. Rotation of the output shaft of the motor 44 is decelerated by a deceleration gear (not illustrated) and is transmitted to the wheels (not illustrated) via the driveshaft.

The internal combustion engine 26 is coupled to the fuel tank, which is arranged in the rear side of the vehicle, via the fuel pipe 21 and is configured to generate the power by burning fuel from the fuel tank. An output shaft (not illustrated) of the internal combustion engine 26 is coupled to an input shaft (not illustrated) of the generator 28. Accordingly, the input shaft of the generator 28 is driven by the power generated by the internal combustion engine 26, and the generator 28 generates the electric power. A front end portion of the internal combustion engine 26 is located in a front side of the vehicle 2 from a front end portion of the motor 44 in the top view. Thus, during a frontal collision of the vehicle, the motor 44 can be protected by the internal combustion engine 26. In this embodiment, a rotary piston engine is adopted as the internal combustion engine 26.

Accordingly, even in the case where the internal combustion engine 26 is arranged between the motor 44 and the generator 28, the motor 44, the internal combustion engine 26, and the generator 28 can be arranged to be compact in an axle direction in the motor chamber 18.

The converter 27 is configured to convert the AC power generated by the generator 28 and the AC power regenerated by the motor 44 into DC power so as to store the DC power in the battery 4. The converter 27 is arranged to overlap an upper surface of the internal combustion engine 26 in the top view. Thus, when the frontal collision of the vehicle occurs, the right side frame 12, the left side frame 16, and the like are deformed so as to be suppressed from interfering with the converter 27. More specifically, during the collision of the vehicle, the right side frame 12, the left side frame 16, or the like that is deformed can abut the internal combustion engine 26 prior to the converter 27. In this way, the converter 27 can be protected by the internal combustion engine 26.

The generator 28 is configured to generate the AC power by the power generated by the internal combustion engine 26, and is configured that the input shaft thereof is rotationally driven by the output shaft of the internal combustion engine 26. The AC power generated by the generator 28 is converted into the DC power by the converter 27 and is stored in the battery 4. The generator 28 is fixed when the upper surface of generator 28 is coupled to the left side frame 16 by a bolt via the left engine mount 15.

Next, a description will be made on a configuration of the protection bracket 50 in the vehicle front structure according to this embodiment with reference to FIG. 2 and FIG. 3.

Figure 3:
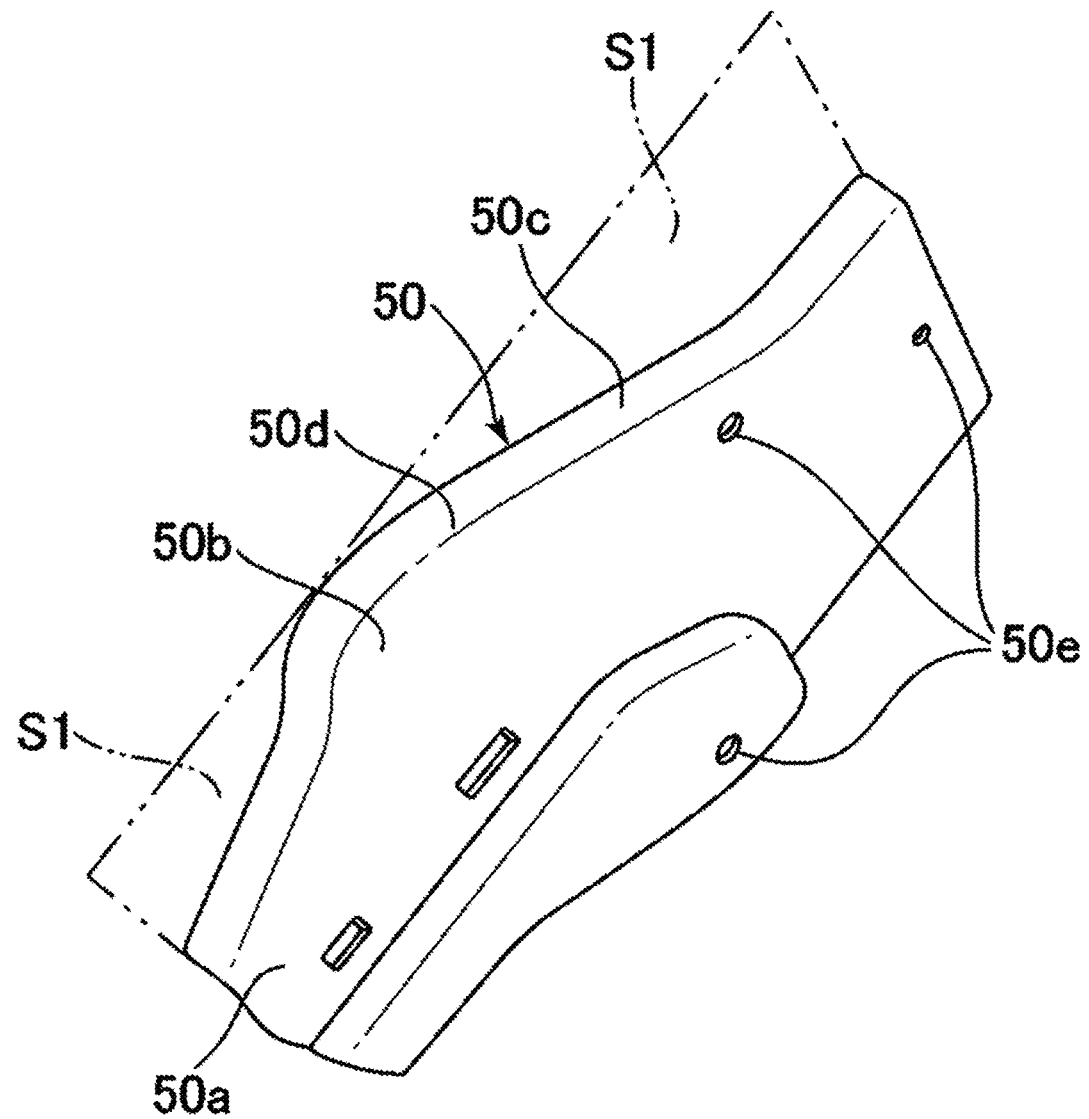
FIG. 3 is a perspective view of a protection bracket in the vehicle front structure according to the embodiment of the present disclosure.

FIG. 3 is a perspective view of the protection bracket in the vehicle front structure according to this embodiment.

As illustrated in FIG. 3, the protection bracket 50 includes a body section 50a, a projected section 50b, an upper surface 50c of the projected section, and a bent section 50d. The body section 50a of the protection bracket is formed in a rectangular shape and is formed by processing a metallic plate in a specified thickness.

The protection bracket 50 is formed with the chevron projected section 50b that is curved and projected upward at a center in the vehicle width direction in the body section 50a in the front view in a state where the protection bracket 50 is attached to the junction box 40 (see FIG. 2). In this way, a first space S1 can be formed on both sides of the projected section. The protection bracket 50 is formed that a maximum length in the vertical direction from a lower end to an upper end thereof is set to a length sufficient to abut the cowl member 10 in the case where the vehicle collides and the power unit 22 moves downward.

The upper surface 50c of the projected section 50b in the protection bracket 50 is not bent abruptly but is gently curved upward. In this way, in the case where the fuel pipe or the like comes into contact with the protection bracket 50, a surface of the fuel pipe or the like is not damaged.

Figure 4A:
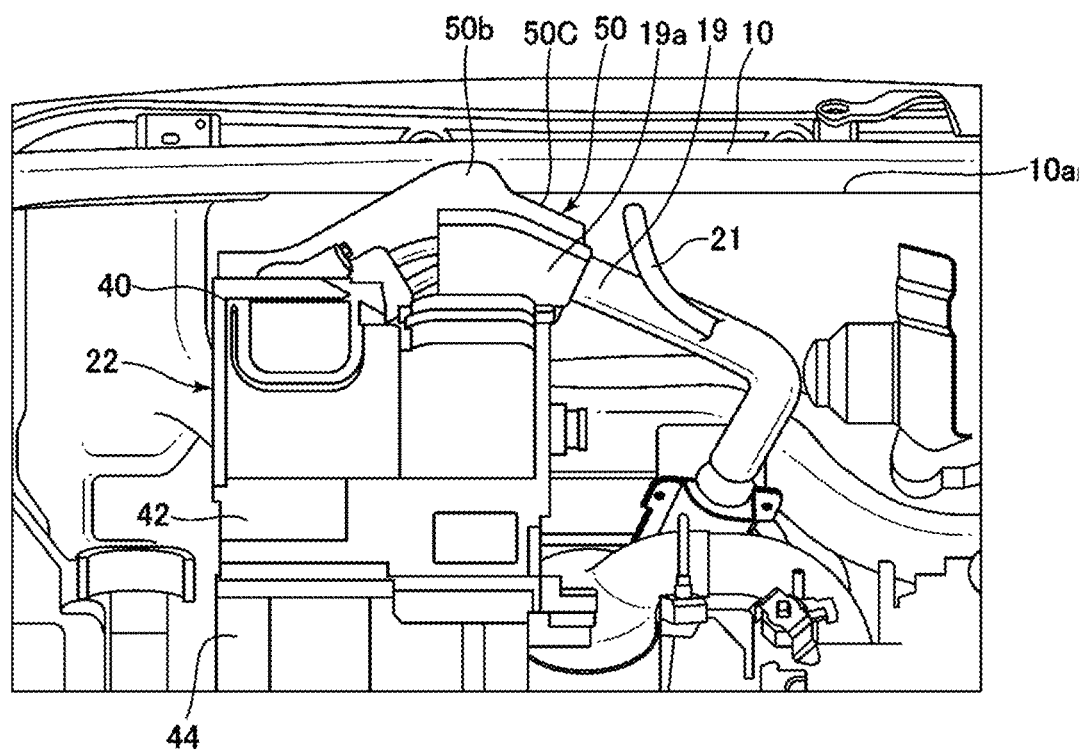
FIG. 4A is a front view of the vehicle front structure before a frontal collision according to the embodiment of the present disclosure.
Figure 4B:
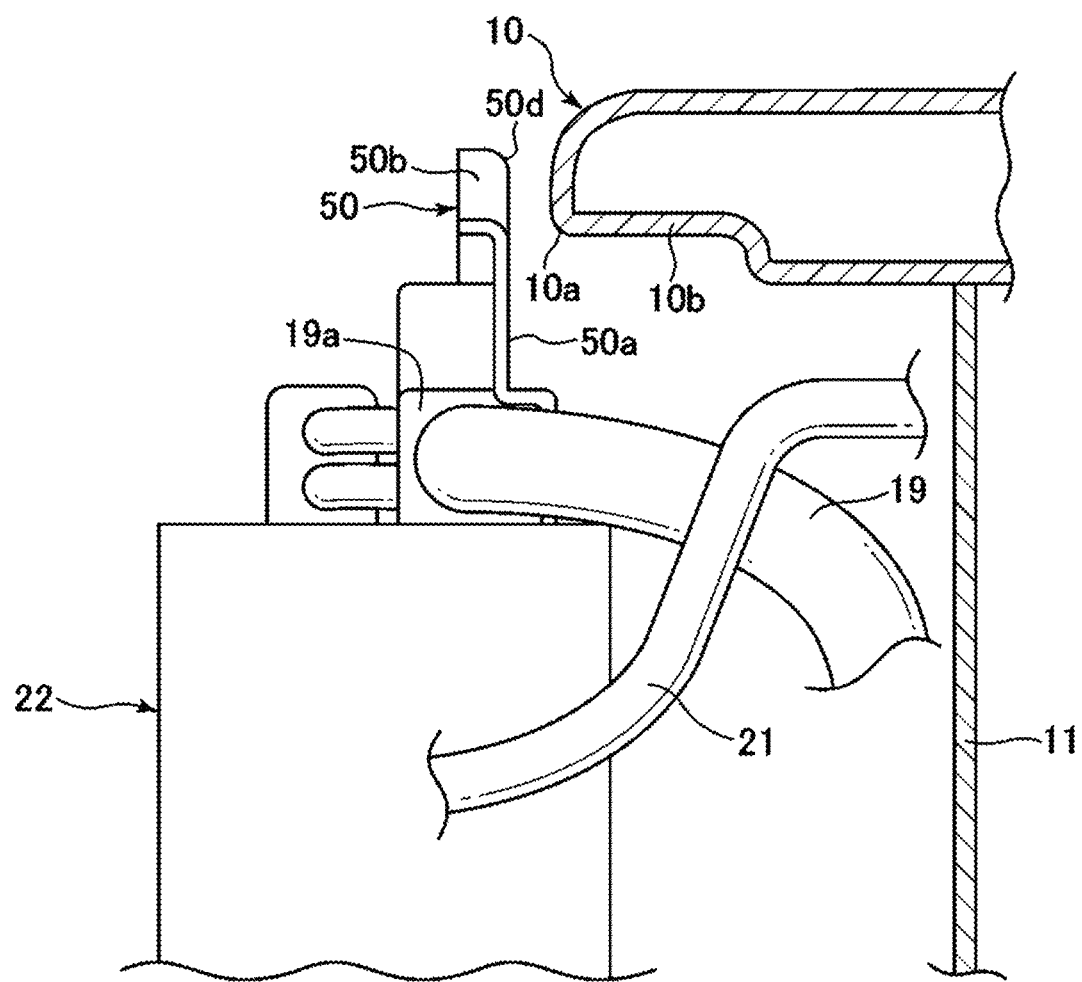
FIG. 4B is a side cross-sectional view of the vehicle front structure before the frontal collision according to the embodiment of the present disclosure.

A rear end of the upper surface 50c of the protection bracket 50 is formed with the bent section 50d that is gently curved downward to the rear and is bent in a circular shape in a side view (see FIG. 4B). In the side view, the bent section 50d is bent more gently with a larger curvature radius than a bent section that is bent downward to the front and is provided at a front end of the upper surface 50c of the protection bracket 50. In this way, in the case where the cowl member 10 abuts the bent section 50d, the cowl member 10 is pushed upward.

In order to fix the protection bracket 50 to the junction box 40, the protection bracket 50 includes three attachment holes 50e, each of which is penetrated by a screw. The protection bracket 50 is attached to the junction box 40 by the screws via the attachment holes 50e. The protection bracket 50 is fixed to the upper surface of the junction box 40 at a position adjacent to the connector 19a of the high-voltage harness 19. In this way, the protection bracket 50 can suppress vibrations of the high-voltage harness 19 that are generated during travel of the vehicle.

As illustrated in FIG. 2, the protection bracket 50 is formed such that a length thereof in the vehicle width direction is longer than a length in the vehicle width direction of the connector 19a of the high-voltage harness 19 in the front view. In addition, the protection bracket 50 is formed such that a length thereof in the vertical direction is longer than a length in the vertical direction of the connector 19a of the high-voltage harness 19 in the front view. The protection bracket 50 is arranged to include the connector 19a of the high-voltage harness 19 within a contour of the protection bracket 50 in the front view. In this way, the connector 19a of the high-voltage harness 19 is protected by the protection bracket 50.

Next, a description will be made on operation of the protection bracket 50 in the vehicle front structure according to this embodiment with reference to FIGS. 4A, 4B, 5A and 5B.

Figure 5A:
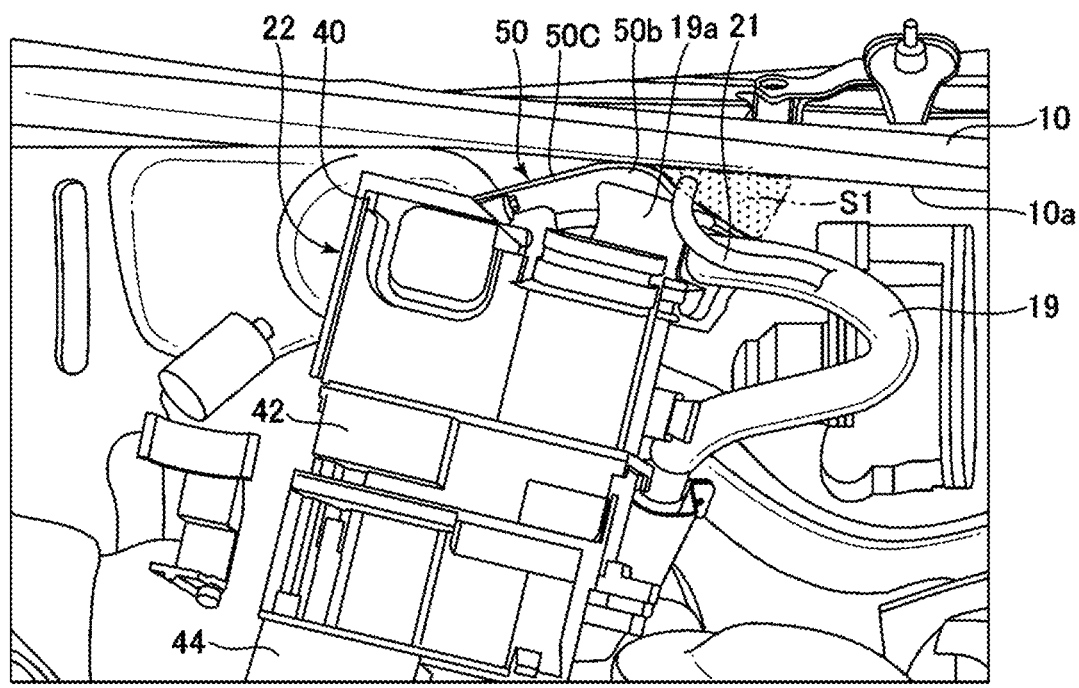
FIG. 5A is a front view of the vehicle front structure after the frontal collision according to an embodiment of the present disclosure.
Figure 5B:
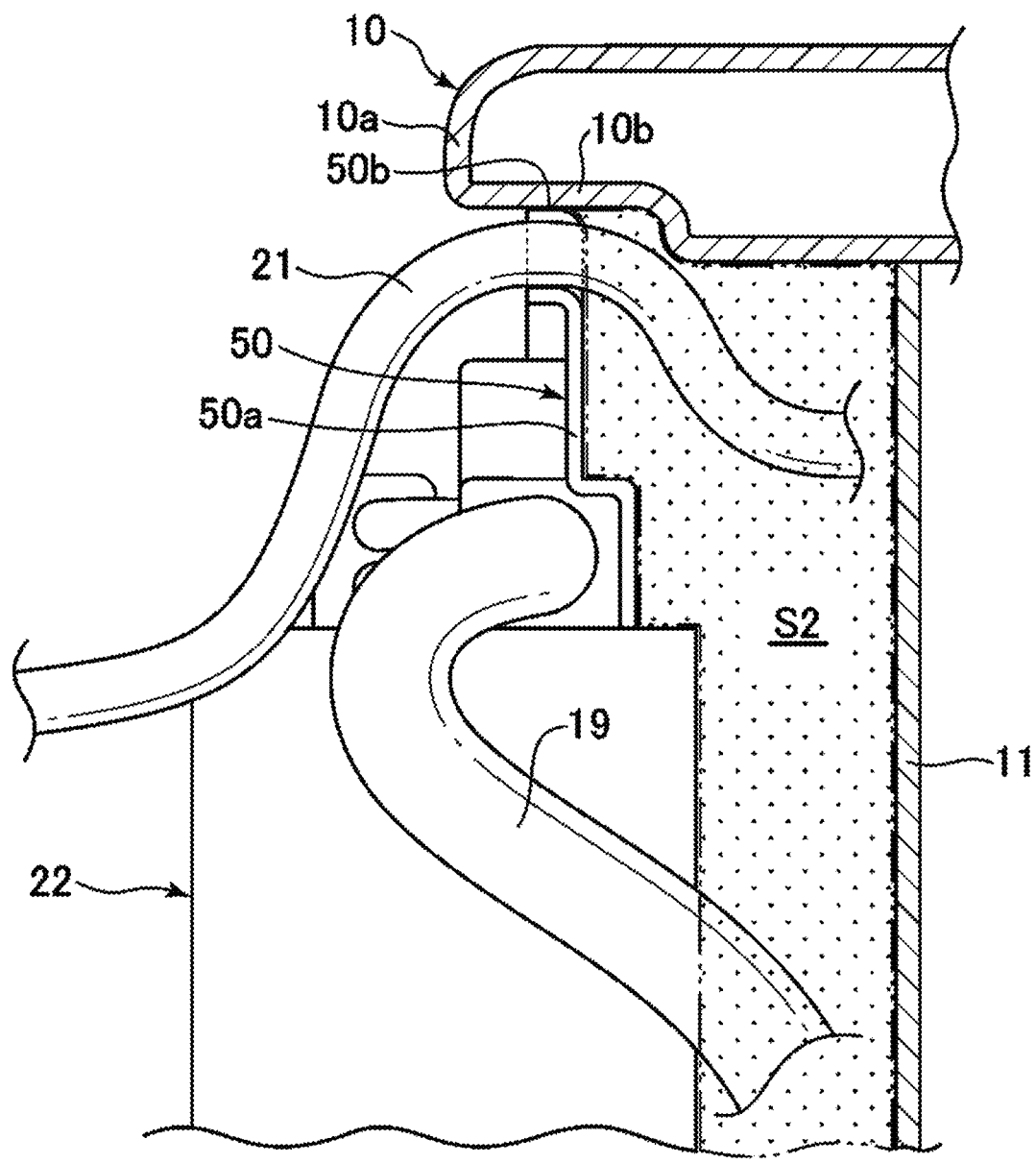
FIG. 5B is a side cross-sectional view of the vehicle front structure after the frontal collision according to the embodiment of the present disclosure.

FIG. 4A is a front view illustrating the vehicle front structure before the frontal collision of the vehicle, FIG. 4B is a side cross-sectional view illustrating the vehicle front structure before the front collision of the vehicle, FIG. 5A is a front view illustrating the vehicle front structure after the frontal collision of the vehicle, and FIG. 5B is a side cross-sectional view illustrating the vehicle front structure after the frontal collision of the vehicle.

FIG. 4A and FIG. 4B each illustrate the vehicle front structure before the frontal collision of the vehicle. In the power unit 22, the motor 44, the inverter 42, and the junction box 40 are stacked in this order from below, and the power unit 22 is provided perpendicularly in the motor chamber 18. The protection bracket 50 and the connector 19a of the high-voltage harness 19 are attached to the upper surface of the junction box 40 in the power unit 22, and the protection bracket 50 extends above the high-voltage harness 19. The protection bracket 50 is arranged to be located near the center in the vehicle width direction of the cowl member and is arranged such that the upper end thereof is located higher than a lower end of the front end 10a of the cowl member 10. The fuel pipe 21 is coupled to the internal combustion engine 26 (not illustrated) and extends toward the tunnel section 6 in the lower portion of the vehicle 2 through a position under the cowl member 10.

FIG. 5A and FIG. 5B each illustrate the vehicle front structure after the right front collision of the vehicle. When receiving a shock at the time of the frontal collision, the right side frame 12 and the left side frame 16 are deformed, and the power unit 22 is pulled downward by the engine mount bracket 17, which is coupled to the bottom surface of the power unit 22, and thus moves downward to the rear in comparison with a position thereof before the collision in FIG. 4.

As illustrated in FIG. 5A and FIG. 5B, the power unit 22 moves downward to the rear after the collision, and the upper end of the protection bracket 50 pushes the cowl member 10 upward and abuts a lower surface 10b of the cowl member 10. When pushing the cowl member 10 upward, the bent section 50d in the circular shape of the protection bracket 50 smoothly pushes the cowl member 10 upward.

After the collision, the upper end of the protection bracket 50 abuts the lower surface 10b of the cowl member 10. Meanwhile, the first space S1 is created on a side of the projected section 50b of the protection bracket 50 (see FIG. 5A). In addition, due to the abutment of the protection bracket 50 against the cowl member 10, the protection bracket stops at a position near the front side of the cowl member 10 in the longitudinal direction. As a result, a second space S2 is created as a space that is surrounded by the rear sides of the protection bracket 50 and the power unit 22 in the longitudinal direction, the lower surface 10b of the cowl member 10, and the front side of the dash panel 11 in the longitudinal direction.

Since the fuel pipe 21 is not coupled to the power unit 22, the fuel pipe 21 freely moves independently of the power unit 22 by the collision shock. However, since the protection bracket 50 abuts the cowl member 10, the fuel pipe 21 is not sandwiched between the protection bracket 50 and the cowl member 10. In addition, since the first space S1 is created on the side of the projected section 50b of the protection bracket 50, the fuel pipe 21 is accommodated in the first space S1. Furthermore, since the second space S2 is created on the rear side of the protection bracket 50, the fuel pipe 21 and the high-voltage harness 19 are accommodated in the second space S2.

Next, a description will be made on (operational) effects of this embodiment.

The vehicle front structure 20 in this embodiment that is configured as described above includes: the cowl member 10 that is formed to extend in the vehicle width direction and bulge to the front from the rear side of the motor chamber 18; the power unit 22 that is fixed to the right side frame 12 or the left side frame 16 via the right engine mount 13 or the left engine mount 15 in the motor chamber 18, has the lower portion fixed to the vehicle body via the engine mount bracket 17, and drives the vehicle by the electric power; and the fuel pipe 21 that couples the internal combustion engine 26 in the motor chamber 18 and the fuel tank arranged in the rear side of the vehicle. In addition, the vehicle front structure 20 in this embodiment is configured that the protection bracket 50 is provided on the upper surface of the power unit and that the upper end of this protection bracket 50 is configured to abut the lower surface 10b of the cowl member 10 when the right front collision of the vehicle 2 occurs and the power unit 22 moves downward to the rear.

According to this embodiment that is configured as described above, the protection bracket 50 is configured to abut the cowl member 10 in the case where the frontal collision of the vehicle 2 occurs and the power unit 22 moves downward to the rear. Accordingly, a clearance is not provided between the cowl member 10 and the protection bracket 50, and it is possible to prevent the fuel pipe 21 from being sandwiched between the cowl member 10 and the protection bracket 50. In this way, it is possible to prevent the fuel pipe 21 from being sandwiched between the power unit 22 and the cowl member 10.

In addition, the protection bracket 50 pushes the cowl member 10 upward and then stops. Thus, the second space S2 can be created on the rear side of the protection bracket 50. In this way, the second space S2 capable of accommodating the fuel pipe 21 and the high-voltage harness 19 can be created, and it is possible to prevent the fuel pipe 21 and the high-voltage harness 19 from being sandwiched.

In addition, according to this embodiment that is configured as described above, the protection bracket 50 includes the projected section 50b that is projected upward in the front view. Thus, it is possible to create the first space S1 in which the fuel pipe 21 is disposed on the side in the vehicle width direction of the projected section 50b of the protection bracket 50. Furthermore, the projected section 50b is curved upward and is projected in the chevron shape. Thus, compared to a case where the projected section 50b is locally projected upward, it is possible to improve strength of the projected section 50b.

According to this embodiment that is configured as described above, the projected section 50b of the protection bracket 50 is formed at the center in the vehicle width direction of the protection bracket 50 in the front view. Thus, a force that is applied to the protection bracket 50 at the time of pushing the cowl member 10 upward can be dispersed in the vehicle width direction. In this way, it is possible to create the first space S1 and the second space S2 by reliably pushing the cowl member 10 upward, and it is thus possible to prevent the fuel pipe 21 from being sandwiched.

Furthermore, according to this embodiment that is configured as described above, the protection bracket 50 includes the bent section 50d, which is bent in the circular shape, at the rear end in the side view. Thus, the cowl member 10 can be pushed upward along the shape that is bent in the circular shape. In this way, it is possible to create the first space S1 and the second space S2 by reliably pushing the cowl member 10 upward, and it is thus possible to prevent the fuel pipe 21 from being sandwiched.

According to this embodiment that is configured as described above, the high-voltage harness 19 is provided to couple the power unit 22 and the battery 4 arranged at the center of the vehicle 2. The protection bracket 50 is formed such that the length thereof in the vehicle width direction is longer than the length of the connector 19a of the high-voltage harness 19 in the front view, and is arranged adjacent to the connector 19a of the high-voltage harness 19. In this way, the connector 19a of the high-voltage harness 19 is protected by the protection bracket 50. Thus, it is possible to prevent damage to the connector 19a of the high-voltage harness 19.

DESCRIPTION OF REFERENCE SIGNS AND NUMERALS

2: Vehicle
4: Battery
10: Cowl member
10a: Front end of cowl member
10b: Lower surface of cowl member
11: Dash panel
12: Right side frame
13: Right engine mount
15: Left engine mount
16: Left side frame
17: Engine mount bracket
18: Motor chamber
19: High-voltage harness
19a: Connector of high-voltage harness
20: Vehicle front structure
21: Fuel pipe
22: Power unit
26: Internal combustion engine
30: Vehicle body
40: Junction box
42: Inverter
44: Motor
50: Protection bracket
50a: Body section of protection bracket
50b: Projected section of protection bracket 50c: Upper surface of protection bracket
50d: Bent section of protection bracket
50e: Attachment hole of protection bracket
S1: First space
S2: Second space

The invention claimed is:

1. A vehicle front structure, comprising:
a cowl to extend in a vehicle width direction and to bulge from a rear side toward a front of a motor chamber arranged in a front portion of a vehicle;
a power supply that is fixed to a side frame in the motor chamber, the power supply having a lower portion fixed to a vehicle body of the vehicle, and the power supply is configured to provide power to the vehicle; and
a protection bracket that is provided on an upper surface of the power supply, wherein
the protection bracket abuts the cowl in a case where there is a frontal collision of the vehicle and the power supply moves downward toward the rear side of the motor chamber.

2. The vehicle front structure of claim 1, further comprising:
a fuel pipe that couples to an internal combustion engine in the motor chamber and a fuel tank arranged in a rear side of the vehicle.

3. The vehicle front structure of claim 1, wherein the protection bracket has a projected section that is projected upward in a front view.

4. The vehicle front structure of claim 3, wherein the projected section of the protection bracket is at a center in the vehicle width direction of the projection bracket in the front view.

5. A vehicle front structure, comprising:
a cowl to extend in a vehicle width direction and to bulge from a rear side toward a front of a motor chamber arranged in a front portion of a vehicle;
a power supply that is fixed to a side frame in the motor chamber, the power supply having a lower portion fixed to a vehicle body of the vehicle, and the power supply is configured to provide power to the vehicle; and
a protection bracket that is provided on an upper surface of the power supply, wherein
the protection bracket has a bent section at a rear end in a side view, the bent section being bent in a circular shape, and
the protection bracket abuts the cowl in a case where there is a frontal collision of the vehicle and the power supply moves downward toward the rear side of the motor chamber.

6. The vehicle front structure of claim 1, further comprising:
a high-voltage harness that couples the power supply and a battery arranged at a center of the vehicle.

7. The vehicle front structure of claim 6, wherein the protection bracket has a length in the vehicle width direction and is longer than a length of a connector of the high-voltage harness in the front view.

8. The vehicle front structure of claim 7, wherein the protection bracket is arranged adjacent to the connector of the high-voltage harness.

9. The vehicle front structure of claim 1, wherein the power supply comprises a junction box, an inverter, and a motor.

10. The vehicle front structure of claim 9, wherein the junction box, the inverter and the motor are stacked in a vertical direction in relation to a top and bottom of the vehicle.

11. A vehicle, comprising:
a motor chamber arranged in a front position of the vehicle;
an internal combustion engine disposed in the motor chamber;
a cowl to extend in a vehicle width direction and to bulge from a rear side toward a front of the motor chamber;
a power supply that is fixed to a side frame in the motor chamber, the power supply having a lower portion fixed to a vehicle body of the vehicle, and the power supply is configured to provide power to the vehicle; and
a protection bracket provided on an upper surface of the power supply, wherein
the protection bracket has a bent section at a rear end in a side view, the bent section being bent in a circular shape, and
the protection bracket abuts the cowl in a case where there is a frontal collision of the vehicle and the power supply moves downward toward the rear side of the motor chamber.

12. The vehicle of claim 11, further comprising:
a fuel pipe that couples to an internal combustion engine in the motor chamber and a fuel tank arranged in a rear side of the vehicle.

13. The vehicle of claim 11, wherein the protection bracket has a projected section that is projected upward in a front view.

14. The vehicle of claim 13, wherein the projected section of the protection bracket is at a center in the vehicle width direction of the projection bracket in the front view.

15. The vehicle of claim 11, further comprising:
a high-voltage harness that couples the power supply and a battery arranged at a center of the vehicle.

16. The vehicle front structure of claim 15, wherein the protection bracket has a length in the vehicle width direction and is longer than a length of a connector of the high-voltage harness in the front view.

17. The vehicle of claim 16, wherein the protection bracket is arranged adjacent to the connector of the high-voltage harness.

18. The vehicle of claim 11, wherein
the power supply comprises a junction box, an inverter, and a motor, and
the junction box, the inverter and the motor are stacked in a vertical direction in relation to a top and bottom of the vehicle.

* * * * *